(12) United States Patent
Ikeda (10) Patent No.: US 9,011,129 B2
(45) Date of Patent: Apr. 21, 2015

(54) LIQUID RESIN MOLDING APPARATUS

(71) Applicant: Nissei Plastic Industrial Co., Ltd., Nagano (JP)

(72) Inventor: Toru Ikeda, Nagano (JP)

(73) Assignee: Nissei Plastic Industrial Co., Ltd. (JP)

( * ) Notice: Subject to any disclaimer, the term of this patent is extended or adjusted under 35 U.S.C. 154(b) by 0 days.

(21) Appl. No.: 14/079,141

(22) Filed: Nov. 13, 2013

(65) Prior Publication Data

US 2014/0134286 A1    May 15, 2014

(30) Foreign Application Priority Data

Nov. 14, 2012   (JP) .................................. 2012-250281

(51) Int. Cl.
  B29C 45/77   (2006.01)
  B29C 45/18   (2006.01)
  B29K 83/00   (2006.01)

(52) U.S. Cl.
  CPC ....... B29C 45/1808 (2013.01); B29K 2083/005 (2013.01)

(58) Field of Classification Search
  USPC .......................................... 425/145, 146, 542
  See application file for complete search history.

(56) References Cited

U.S. PATENT DOCUMENTS

| | | | |
|---|---|---|---|
| 2003/0042640 A1* | 3/2003 | Kubota | 264/40.1 |
| 2012/0034330 A1* | 2/2012 | Fujita et al. | 425/4 R |

FOREIGN PATENT DOCUMENTS

| | | |
|---|---|---|
| JP | 57014027 | 1/1982 |
| JP | 2000203473 | 7/2000 |
| JP | 2000334775 | 12/2000 |
| JP | 2004249243 | 9/2004 |
| JP | 2005254539 | 9/2005 |
| JP | 2008014278 | 1/2008 |
| JP | 4373932 | 11/2009 |

OTHER PUBLICATIONS

Notification of Reasons for Refusal mailed Sep. 24, 2014 issued in Japanese Appln. No. P2012-250281.

* cited by examiner

*Primary Examiner* — Tim Heitbrink (74) *Attorney, Agent, or Firm* — Adams & Wilks (57) ABSTRACT

In a liquid resin molding apparatus including a mold, an injection machine, a metering/supplying mechanism for metering a liquid resin material and supplying a metered amount of liquid resin material to the injection machine, and a pump for pressure-feeding the liquid resin material to the metering/supplying mechanism, the pump is a piston pump having a piston and an actuator for reciprocating the piston, and a discharge pressure of the piston pump is set to be at least 1.5 times a supply pressure with which the liquid resin material is supplied to the metering/supplying mechanism. A pressure reducing valve is disposed in a supply path extending from the piston pump to the metering/supplying mechanism, so as to reduce a pressure of the liquid resin material from the discharge pressure to the supply pressure.

3 Claims, 6 Drawing Sheets

LIQUID RESIN MOLDING APPARATUS

FIELD OF THE INVENTION

The present invention relates to a liquid resin molding apparatus for molding a low viscosity liquid resin material into a molded article.

BACKGROUND OF THE INVENTION

The injection molding is extensively used, wherein a molded article is produced by injecting a resin material from an injection machine into a mold while the mold is closed by a mold clamping device. In general, the resin material is supplied to the injection machine in the form of (solid) resin beads. The resin beads are charged into a heating cylinder in which they are plasticized, mixed and kneaded into a material of high fluidity. The flowable material is injected into the mold and, after solidification within the mold, the injected material forms a molded article.

In the case of resin materials as typified by silicone rubber, they are fed into the injection machine in the form of a liquid material and injected from the injection machine into the mold. These materials will be hereinafter referred to as "liquid resin materials" as they are in a liquid state before being supplied into the injection machine.

One example of such liquid resin materials is a two-part liquid resin material. The two-part liquid resin material is composed of a first liquid forming a base resin, and a second liquid forming an additive represented by a hardener. When the base resin and the hardener are mixed together, a mixture will cure or solidify, by the action of the hardener, with a predetermined hardness for several hours to several tens of hours at room temperature or for several tens of seconds to several tens of minuets at a molding temperature. In the case where the hardener is used, it is desirable that the hardener is added with the base resin as late as possible in order to prevent clogging of piping.

For the liquid resin materials that are easy to solidify, various feeding techniques have been proposed. One example of such prior proposals is disclosed, for example, in Japanese Patent (JP-B) No. 4373932.

Figure 7:
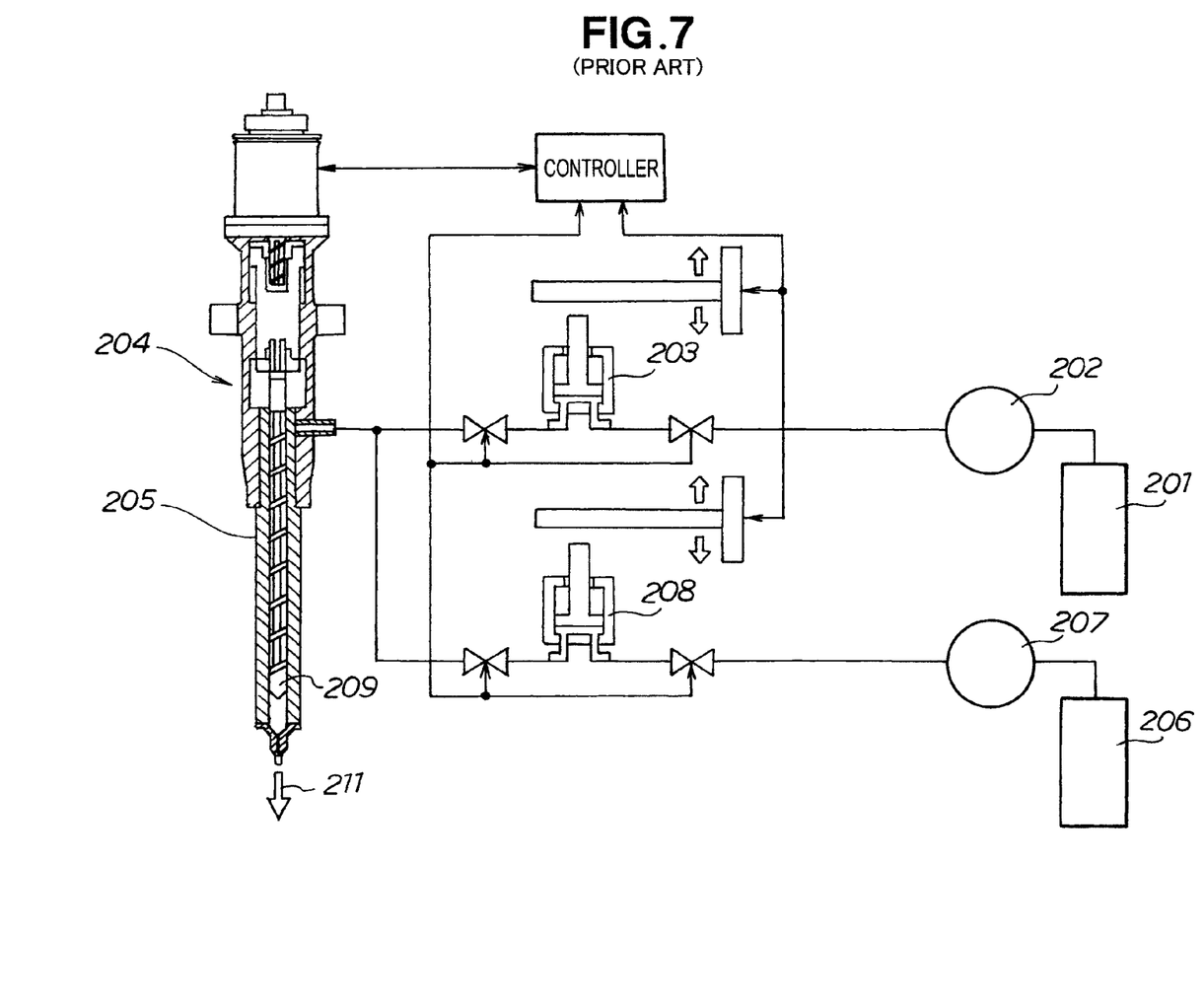
FIG. 7 is a diagrammatical view showing a general configuration of a conventional liquid resin material feeding device.

FIG. 7 hereof shows a general configuration of a liquid resin material feeding device disclosed in JP 4373932B. As shown in this figure, a base resin 201 is pressure fed by a pump 202 into a metering cylinder 203, and a metered amount of base resin is supplied from the metering cylinder 203 to a heating cylinder 205 of an injecting machine 204. On the other hand, a hardener 206 is pressure-fed by a pump 207 into a metering cylinder 208, and a metered amount of hardener is supplied from the metering cylinder 208 into the heating cylinder 205 of the injection machine.

The base resin 201 and the hardener 206 are mixed and kneaded by a screw 209 in the heating cylinder 205 and subsequently injected as indicated by a profiled arrow 211.

Though not described in JP 4373932B, a rotary pump or a reciprocating pump is normally employed for the pumps 202, 207. The reciprocating pump is inexpensive as compared to the rotary pump. The reciprocating pump is available in various forms such as a swash plate pump having plungers driven by a swash plate, and a piston pump having a reciprocating piston in a cylinder. The piston pump is advantageous for its lower cost as compared to the swash plate pump.

The piston pump is, however, disadvantageous for its delivery pressure fluctuation which is incomparably greater than that of the swash plate pump. When the pressure for feeding each material 201, 206 to a corresponding one of the metering cylinders 203, 208 fluctuates, the metered material value also fluctuates. It has, therefore, been recommended for the liquid resin material feeding device to use a rather expensive pump other than the piston pump. However, reduction of the equipment cost is demanded, and, under such conditions, the adoption of the piston pump is recommended.

SUMMARY OF THE INVENTION

It is, therefore, an object of the present invention to provide a liquid resin molding apparatus which is capable of employing a piston pump.

According to the present invention, there is provided a liquid resin molding apparatus comprising: a mold; an injection machine that injects a liquid resin material into the mold; a metering/supplying mechanism that meters the liquid resin material and supplies a metered amount of liquid resin material to the injection machine; a pump that pressure-feeds the liquid resin material to the metering/supplying mechanism, wherein the pump is a piston pump having a piston and an actuator for reciprocating the piston, and a discharge pressure of the piston pump is set to be at least 1.5 times a supply pressure with which the liquid resin material is supplied to the metering/supplying mechanism; and a pressure reducing valve disposed in a supply path extending between the pump and the metering/supplying mechanism, so as to reduce a pressure of the liquid resin material from the discharge pressure to the supply pressure.

With the discharge pressure of the piston pump being set to be at least 1.5 times the supply pressure with which the liquid resin material is supplied to the metering/supplying mechanism, the piston pump has a room or margin on the discharge pressure thereof to the extent that the discharge pressure can be reduced by a pressure reducing valve. With the pressure reduction achieved by the pressure reducing valve, fluctuations of the discharge pressure of the piston pump are greatly reduced. The foregoing arrangement ensures that a piston pump can be used in the liquid resin molding apparatus.

Preferably, the discharge pressure of the piston pump has an upper limit set to be 9 times the supply pressure. With the upper limit thus set for the piston pump discharge pressure, it is possible to prevent an increase in the size and cost of the piston pump.

In one preferred form of the invention, a plurality of injection machines and a corresponding number of metering/supplying mechanisms are provided, and the pump is a singular number and arranged to pressure-feed the liquid resin material to all of the metering/supplying mechanisms. The single pump, which is capable of covering the liquid-resin-material supply to the plurality of metering/supplying mechanisms, can reduce a part of the equipment cost related to the pump, leading to a reduction in the overall equipment cost of the liquid resin molding apparatus.

BRIEF DESCRIPTION OF THE DRAWINGS

Certain preferred structural embodiments of the present invention will be described in detail herein below, by way of example only, with reference to the accompanying sheets of drawings, in which.

DESCRIPTION OF THE PREFERRED EMBODIMENTS

Figure 1:
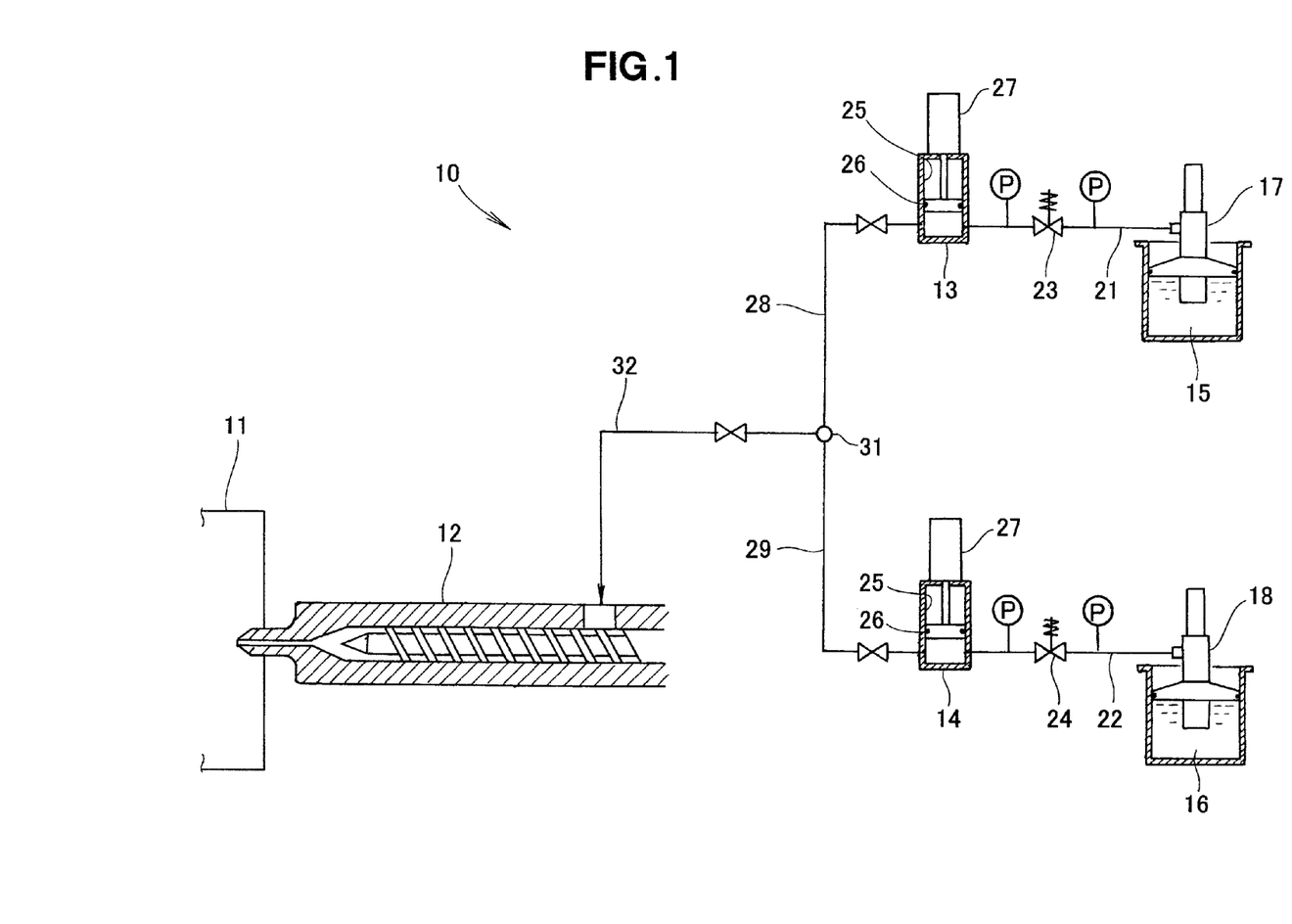
FIG. 1 is a diagrammatical view showing a general configuration of a liquid resin molding apparatus according to an embodiment of the present invention.

Referring now to the drawings and FIG. 1 in particular, there is shown a general configuration of a liquid resin molding apparatus 10 according to a first embodiment of the present invention. As shown in this figure, the liquid resin molding apparatus 10 generally comprises a mold 11, an injection machine 12 that injects a resin material into the mold 11, first and second metering/supplying mechanisms 13, 14 that meter respective liquid resin materials 15, 16 and supply metered amounts of liquid resin materials 15, 16 to the injection machine 12, first and second pumps 17, 18 that pressure-feed the respective liquid resin materials 15, 16 to the first and second metering/supplying mechanisms 13, 14, respectively, first and second supply paths 21, 22 extending, respectively, from the first and second pumps 17, 18 to the first and second metering/supplying mechanisms 13, 14, and first and second pressure reducing valves 23, 24 provided in the first and second supply paths 21, 22, respectively.

The liquid resin material 15 is a base resin, and the liquid resin material 16 is a hardener, for example. Reference symbol "P" in a circle shown in FIG. 1 denotes a pressure gauge provided on both an upstream side and a downstream side of each of the pressure reducing valves 23, 24.

The first metering/supplying mechanism 13 includes a cylinder 25, a piston 26 reciprocably received in the cylinder 25, and a piston moving means 27 for moving the piston 26. The first metering/supplying mechanism 13 is configured to meter the liquid resin material (base resin) 15 pressure-fed from the first pump 17 and supply a metered amount of liquid resin material (base resin) to the injection machine 12. The second metering/supplying mechanism 14 is structurally and functionally the same as the first metering/supplying mechanism 13 and, hence, a further description thereof can be omitted.

A first feed path 28 extending from the first metering/supplying mechanism 28 and a second feed path 29 extending from the second metering/supplying mechanism 28 join together at a mixing section 31 where the two liquid resin materials (base resin and hardener) are mixed with each other. A mixture (of the base resin 15 and the hardener 16) is supplied via a supply pipe 32 to the injection machine 12.

Figure 2:
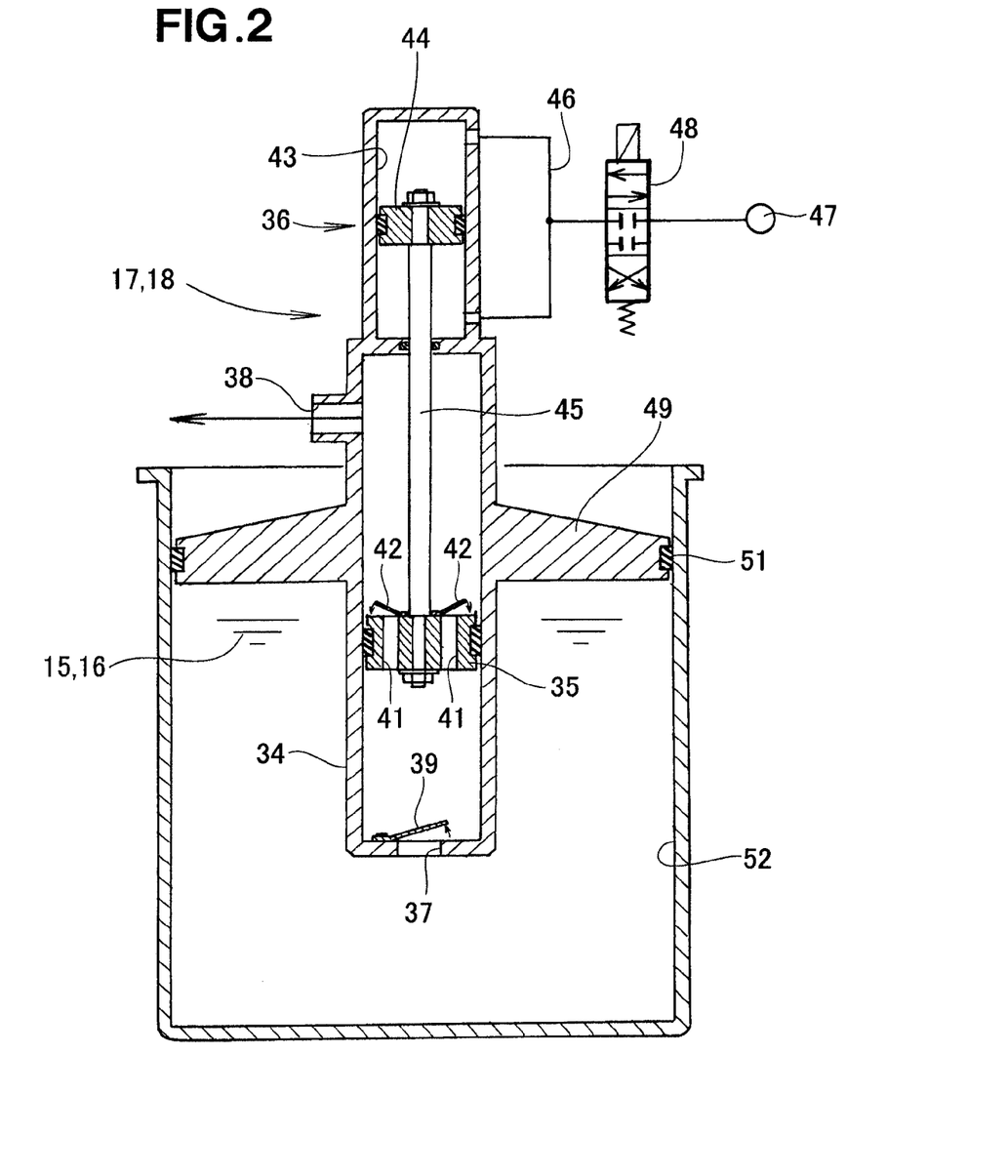
FIG. 2 is a cross-sectional view of a piston pump used in the liquid resin molding apparatus.

Structural examples of the first and second pumps 17, 18 and the first and second pressure reducing valves 23, 24 will be described in detailed below. As shown in FIG. 2, the first and second pumps 17, 18 each include a pump case 34 in the form of a bottomed hollow cylinder, a piston 35 slidably received in the pump case 34 for undergoing reciprocating movement in an axial direction of the pump case 34, and an actuator 36 for reciprocating the piston 35.

The pump case 34 has an intake port 37 formed at a bottom thereof, a discharge port 38 formed at an upper portion of the pump case 34, and a first pump valve 39 associated with the intake port 37. The piston 35 has a plurality of axial through-holes 41, and a corresponding number of second pump valves 42 each associated with a corresponding one of the axial through-holes 41.

The actuator 36 may take any form of configuration. In the illustrated embodiment, the actuator 36 is in the form of a cylinder 43, a piston 44 reciprocably received in the cylinder 43, a piston rod 45 extending from the piston 44 and connected to the piston 35 of the pump 17, 18, an air pipe 46 for the passage therethrough of high-pressure air supplied to an upper chamber or a lower chamber of the cylinder 43 formed on either side of the piston 44, and a directional control valve 48 that controls or switches the direction of the high-pressure air supplied from an air source 47. By switching the valve position of the directional control valve 48, the piston 44 is moved upward or downward so that the piston 35 of the pump 17, 18 moves in the same direction as the piston 44 of the actuator 36.

The actuator 36 may take the form of an electric cylinder or a crank mechanism which transfers a rotary motion to a linear reciprocating motion. Furthermore, the directional control valve 48 may be built in the cylinder 43 in which instance air passages can be switched only by the pressure of air. By using a cylinder equipped with a built-in directional control valve, an electromagnetic valve and an electric wiring can be dispensed with.

In the illustrated embodiment, the pump case 34 has a circular disc-like top lid 49 as an integral part of the pump case 34. The top lid 49 is provided with a seal member 51 at an outer periphery thereof and has an outside diameter corresponding to an inside diameter of a cylindrical container 52 called a "pail". The first pump 17 or the second pump 18 is set in the container 52 in which the liquid resin material (base resin) 15 or the liquid resin material (hardener) 16 is retained. In this instance, the top lid 46 is placed on an upper surface of the liquid resin material 15, 16 so that the outside air is prevented from getting into the liquid resin material 15, 16.

When the actuator 36 operates to move the piston 35 downward, the first pump valve 39 closes and the second pump valves 42 open so that the liquid resin material 15, 16 moves into a space or chamber defined above the piston 35. When the piston 35 reaches a downward stroke end, the direction of movement of the piston 35 is switched to an upward direction. This will cause the first pump valve 39 to open and also cause the second pump valves 42 to close. As the piston 35 moves upward, the liquid resin material 15, 16 staying above the piston 35 is pressurized and discharged (or pressure-fed) from the discharge port 38. At the same time, the liquid resin material 15 or 16 held in the container 52 is drawn through the intake port 37 into a space or chamber defined below the piston 35.

The first and second pumps 17, 18 are called "piston pumps" as the liquid resin material 15 or 16 is discharged upon reciprocating movement of the piston 35. The piston pump is simplest in structure and extremely inexpensive. However, due to a momentary stop of the piston 35 at a downward or an upward stroke end thereof, the piston pump has a relatively large discharge pressure fluctuation as compared to rotary pumps and swash-plate piston pumps.

Figure 3:
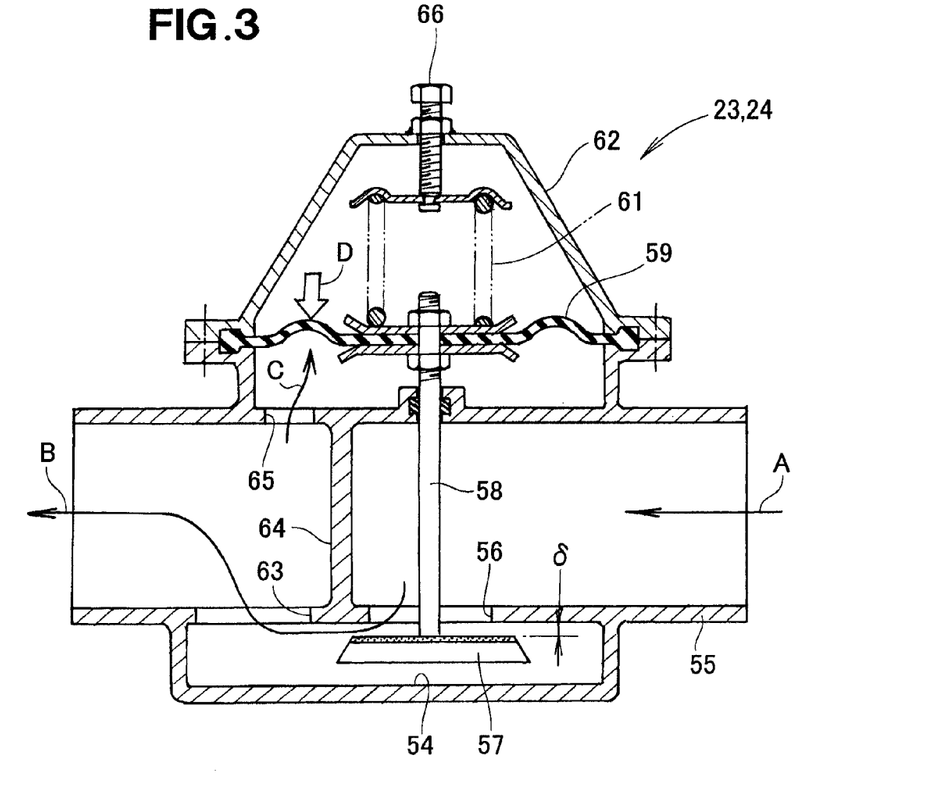
FIG. 3 is a cross-sectional view of a pressure reducing valve used in the liquid resin molding apparatus.

In order to smoothen the discharge pressure fluctuation, the first and second pressure reducing valves 23, 24 are employed according to the present invention. As shown in FIG. 3, the first and second pressure reducing valves 23, 24 each include a valve casing 55 having a bypass-like passage 54, a valve element 57 for opening and closing an inlet 56 of the passage 54, a valve stem 58 extending from the valve element 57 in an upward direction across the valve casing 55, a diaphragm 59 connected to a distal end portion of the valve stem 58, a valve spring 61 normally urging the diaphragm 59 in a direction to open the valve element 57, and a diaphragm case 62 for covering the valve spring 61 and the diaphragm 59.

The valve casing 55 has an internal space blocked or partitioned by a wall 64 located between the inlet 56 and an outlet 63 of the passage 54. The valve casing 55 also has a pilot hole 65 located on a downstream side of the wall 64. With this arrangement, when the liquid resin material flows into the valve casing 55 as indicated by the arrow A, the liquid resin material first enters the passage 54 from the inlet port 56, then flows downstream along the passage 54, and flows out from the valve casing 55 via the outlet 63, as indicated by the arrow B. A downstream side of the wall 64 will be referred to as "primary side" and an upstream side of the wall 64 will be referred to as "secondary side". A pressure of the liquid resin material on the primary side of the wall 64 (primary pressure) is equal to a discharge pressure of the piston pump 17, 18, and a pressure of the liquid resin material on the secondary side of the wall 64 (secondary pressure) is equal to a supply pressure with which the liquid resin material is supplied to the metering/supplying mechanism 13, 14. The secondary pressure of the liquid resin material acts on an undersurface of the diaphragm 59 to thereby lift the diaphragm 59 in an upward direction, as indicated by the arrow C. The diaphragm 59 is normally urged downward by the valve spring 61, as indicated by the arrow D. A valve opening 6 of the pressure reducing valve 23, 24 is determined at a point where the secondary pressure of the liquid resin material indicated by the arrow C and the force of the valve spring 61 indicated by the arrow D balance each other.

As the primary pressure of the liquid resin material reduces, the secondary pressure of the liquid resin material reduces and the pressure tending to lift up the diaphragm 59 as indicated by the arrow C also reduces. This will cause the diaphragm 59 to move downward by the force of the valve spring 61 so that valve opening 6 increases whereupon a pressure loss around the inlet 56 reduces and the secondary pressure of the liquid resin material increases.

When the secondary pressure of the liquid resin material exceeds a predetermined value, the pressure tending to lift up the diaphragm as indicated by the arrow C increases. This will cause the diaphragm 61 to compress the valve spring 61 so that the valve opening 5 reduces whereupon the pressure loss around the inlet 56 increases and the secondary pressure of the liquid resin material reduces. Thus, the secondary pressure is kept constant even when the primary pressure undergoes fluctuation. The secondary pressure of the liquid resin material can be adjusted by turning an adjustment screw 66 which is associated with the valve spring 61 for adjusting the biasing force of the valve spring 61.

Due to a relatively large pressure loss occurring around the inlet 56, the secondary pressure is considerably smaller than the primary pressure. This means that the pressure of the liquid resin material is always reduced by means of the pressure reducing valve 23, 24.

A control system in which the force indicated by the arrow D is applied from the exterior is called "power-actuated control". On the other hand, a control system employed in the first and second pressure reducing valves 23, 24 is called "self-actuated control" because the force indicated by the arrow D is generated by the valve spring 61 as a structural component of the pressure reducing valve 23, 24. Thus, the first and second pressure reducing valves 23, 24 comprise a self-actuated pressure reducing valve having a performance to keep the secondary pressure constant during operation.

Figure 4:
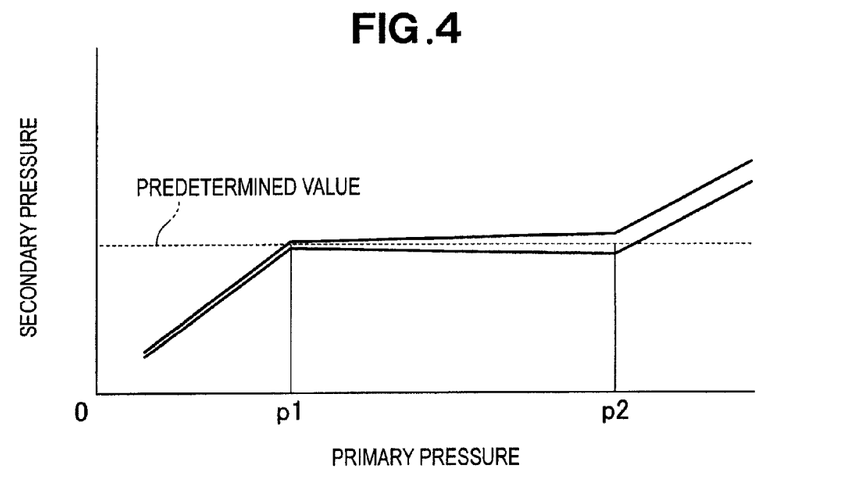
FIG. 4 is a graph showing characteristics of the pressure reducing valve.

As shown in FIG. 4, when the primary pressure is in a range of from p1 to p2, the secondary pressure is kept substantially at a predetermined value. When the primary pressure is less than p1, the secondary pressure becomes smaller than the predetermined value and does not remain at the predetermined value. Similarly, when the primary pressure exceeds p2, the secondary pressure becomes greater than the predetermined value and does not remain at the predetermined value. This means that a pressure range less than p1 and a pressure range greater than p2 are outside a control range of the self-actuated pressure control valve 23, 24, which is within a range between p1 and p2.

An experiment made according to the present invention will be described below. The experiment should be considered in all respects as illustrative and not restrictive.

(1) Experimental Equipment:
The first pump 17, the first pressure reducing valve 23, and the first metering/supplying mechanism 13 of the liquid resin molding apparatus 10 shown in FIG. 1 was used.

(2) Liquid Resin Materials Used:
Product Name: KE-1950-40 (A/B), manufactured by Shin-Etsu Chemical Co., Ltd.

(3) Specification of First Pump:
Discharge: 75 $cm^3$/stroke (1500 $cm^3$/min)
Maximum Discharge Pressure: 12 MPa
Experimental Discharge Pressure: 3 MPa, 6 MPa, and 9 MPa (Controlled by Valve)

(4) Setting of First Pressure Reducing Valve:
Secondary Pressure: 1 MPa, 2 MPa (4) Specification of First Metering/Supplying Mechanism:
Discharge (Standard Value): 5 $cm^3$/each measurement An experiment was made under the conditions specified above and a discharge from the first metering/supplying mechanism was measured with the results shown in FIG. 5. A graph shown in FIG. 5, a horizontal axis represents the primary pressure, and a vertical axis represents the relative discharge.

Figure 5:
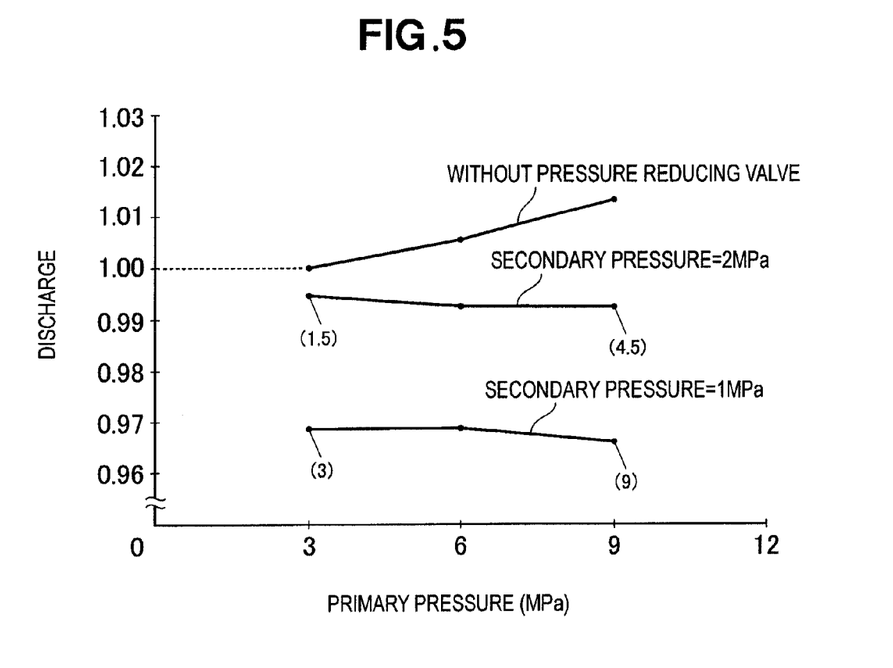
FIG. 5 is a graph showing an advantageous effect attained by the pressure reducing valve.

As shown in FIG. 5, when the primary pressure is 3 MPa achieved without the first pressure reducing valve, the discharge is given with a value 1.00. In the absence of the first pressure reducing valve, the discharge increases with an increase in the primary pressure. As the primary pressure increases from 3 MPa to 9 MPa, the discharge increases from 1.00 to 1.014 and the rate of fluctuation of the discharge is represented by 1.4%.

When the secondary pressure is set at 2 MPa, the discharge is substantially constant regardless of a change in the primary pressure from 3 to 9 MPa. More specifically, the discharge is kept within a range of from 0.993 to 0.995 and, hence, the rate of fluctuation of the discharge is 0.2%, which is obtained by calculation formula: (0.995−0.993)/0.993=0.002.

Furthermore, for the secondary pressure I set at 1 MPa, the discharge is substantially constant regardless of a change in the primary pressure from 3 to 9 MPa, More specifically, the discharge is kept within a range of from 0.966 to 0.970 and, hence, the rate of fluctuation of the discharge is 0.4%, which is obtained by calculation formula: (0.970−0.996)/0.996=0.004.

Numerical values in parentheses shown in FIG. 5 each indicate a ratio of the primary pressure to the secondary pressure. As is evident from FIG. 5, it is experimentally confirmed that the discharge from the first metering/supplying mechanism is substantially constant as long as the primary to secondary pressure ratio is within a range of from 1.5 to 9.

As previously described, the pump used in the present invention is an inexpensive piston pump. By virtue of the inexpensiveness, the piston pump used in the present invention is allowed to have over-specifications. The piston pump with over-specifications has a room or margin on its capacity and performance to the extent that it can operate efficiently when used with a plurality of injection machines.

Figure 6:
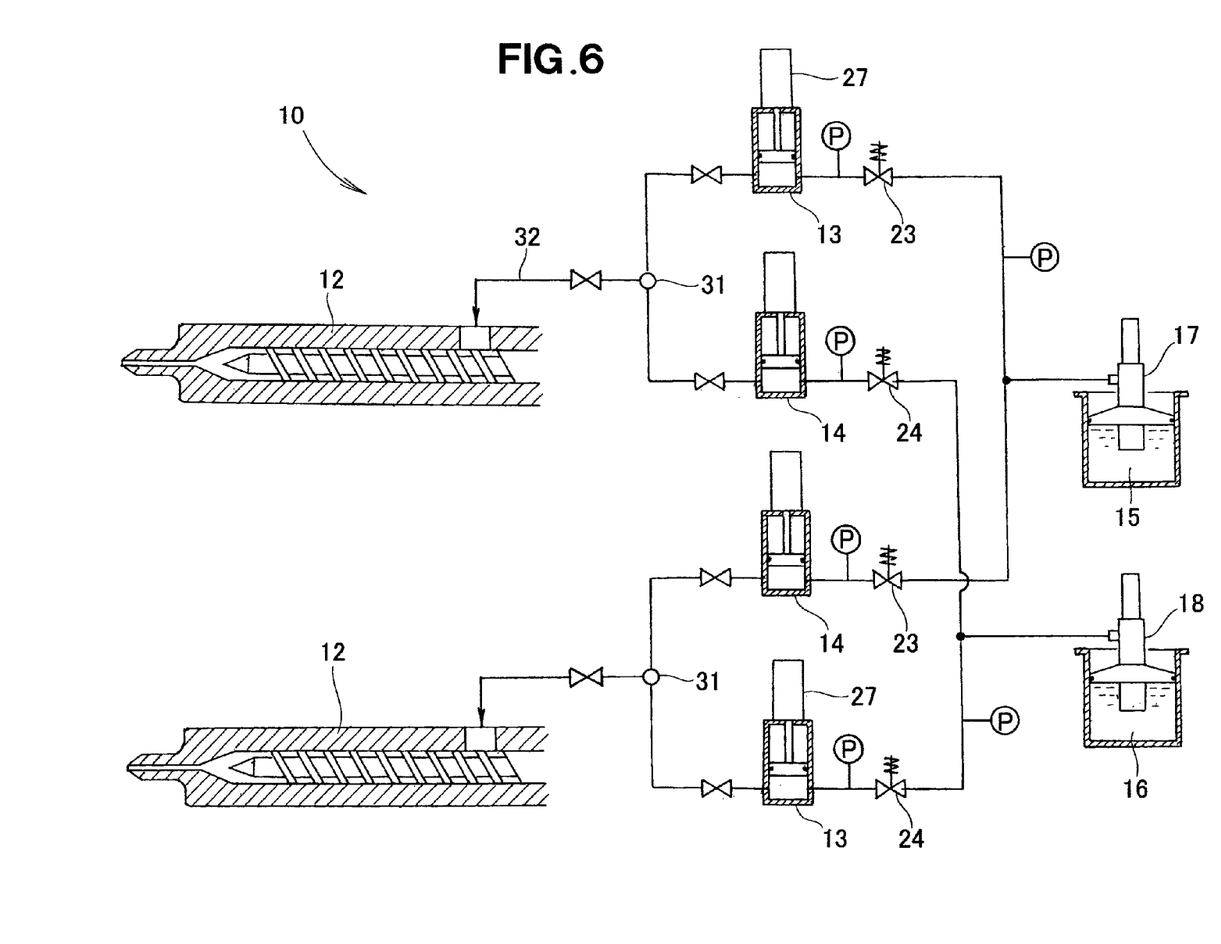
FIG. 6 is a diagrammatical view of a liquid resin molding apparatus according to another embodiment of the present invention.

In one form of the invention shown in FIG. 6, the first and second pumps 17, 18 are able to supply liquid resin materials to at least two injection machines 12, 12. The number of the injection machines may be three or more. In this embodiment, the two injection machines 12 commonly use the first and second pumps 17, 18 so that the reduction of the equipment cost is possible. Other structural parts or components are identical to those shown in FIG. 1 and further description thereof can be omitted.

The present invention has for its object the elimination of a pressure fluctuation of a piston pump. Accordingly, the present invention can be applied to such a liquid resin molding apparatus which includes a pump, a metering/supplying mechanism and a pressure reducing valve that are provided as a single set for each injection machine.

INDUSTRIAL APPLICABILITY

The present invention is particularly suitable for use in a liquid resin molding machine using an inexpensive piston pump.

Obviously, various minor changes and modifications of the present invention are possible in light of the above teaching. It is therefore to be understood that within the scope of the appended claims the invention may be practiced otherwise than as specifically described.

What is claimed is:

1. A liquid resin molding apparatus comprising:
a mold;
an injection machine that injects a liquid resin material into the mold;
a metering/supplying mechanism that meters the liquid resin material and supplies a metered amount of liquid resin material to the injection machine;
a pump that pressure-feeds the liquid resin material to the metering/supplying mechanism, wherein
the pump is a piston pump having a piston and an actuator for reciprocating the piston, and a discharge pressure of the piston pump is set to be at least 1.5 times a supply pressure with which the liquid resin material is supplied to the metering/supplying mechanism; and
a pressure reducing valve disposed in a supply path extending between the pump and the metering/supplying mechanism, so as to reduce a pressure of the liquid resin material from the discharge pressure to the supply pressure.

2. The liquid resin molding apparatus according to claim 1, wherein the discharge pressure of the piston pump has an upper limit set to be 9 times the supply pressure.

3. The liquid resin molding apparatus according to claim 1, wherein a plurality of injection machines and a corresponding number of metering/supplying mechanisms are provided, and the pump is a singular number and arranged to pressure-feed the liquid resin material to all of the metering/supplying mechanisms.

* * * * *